United States Patent [19]

Rayburn

[11] Patent Number: 4,752,856
[45] Date of Patent: Jun. 21, 1988

[54] CAPACITIVE STRUCTURE
[75] Inventor: Charles C. Rayburn, Forest, Va.
[73] Assignee: Illinois Tool Works Inc., Chicago, Ill.
[21] Appl. No.: 59,751
[22] Filed: Jun. 8, 1987
[51] Int. Cl.[4] .............. H01G 1/14; H01G 4/06; H01G 7/00
[52] U.S. Cl. .................. 361/309; 361/313; 29/25.42
[58] Field of Search ................ 361/328–330, 361/308–313, 321, 323, 324, 433

[56] References Cited
U.S. PATENT DOCUMENTS

| | | | |
|---|---|---|---|
| 2,476,455 | 7/1949 | Roush | 361/312 |
| 3,496,434 | 2/1970 | Prokopowicz | 361/321 X |
| 3,851,363 | 12/1974 | Booe | 361/308 X |
| 4,613,518 | 9/1986 | Ham et al. | 361/309 X |

FOREIGN PATENT DOCUMENTS

| | | | |
|---|---|---|---|
| 2555355 | 5/1985 | France | 361/321 |
| 3766 | 1/1985 | Japan | 361/328 |

Primary Examiner—Donald A. Griffin
Attorney, Agent, or Firm—Thomas W. Buckman

[57] ABSTRACT

An improved capacity structure of the type comprising a group of capacitive layers of equal width, each including a dielectric substrate and a metallic area, which covers a major portion of an upper surface of the dielectric substrate and which extends to one edge of the dielectric substrate, a mass of conductive material covering each edge of such layer so as to provide electrical connections to and between the metallic areas extending to such edge. The metallized areas on alternate layers extend to opposite edges. A group of at least three dielectric layers of equal width, in stacked relation to each other, covers the group of capacitive layers at its top surface. A group of at least three dielectric layers of equal width, in stacked relation to each other, covers the group of capacitive layers at its bottom surface. Alternative ones of the layers of each group are offset laterally such that indentations are formed along each edge whereby the conductive masses, which substantially fill the indentations, bond the capacitive and dielectric layers tightly to each other. Additionally, a covering tape may be adhesively applied.

11 Claims, 1 Drawing Sheet

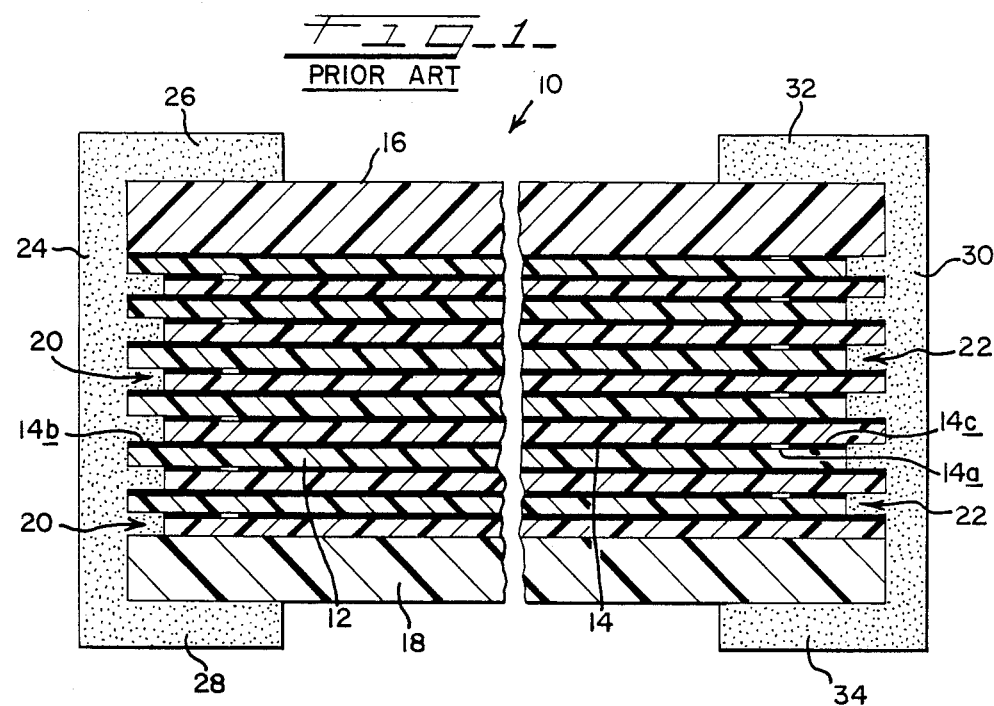
FIG-1-
PRIOR ART
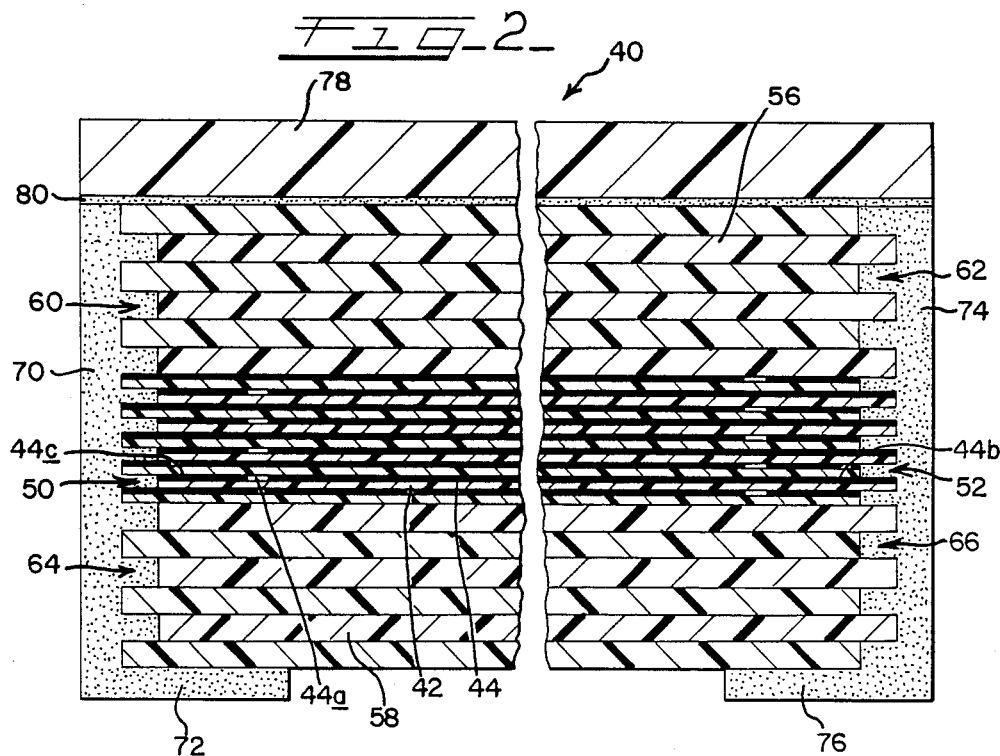
FIG-2-

CAPACITIVE STRUCTURE

BACKGROUND OF THE INVENTION

This invention pertains to an improved capacitive structure of a type comprising a group of capacitive layers, each of which includes a dielectric substrate and a metallized area on one surface of the dielectric substrate and which are arranged such that the metallized areas on alternate layers extend to opposite edges of the capacitive structure, and opposed masses of conductive material, each of which covers one such edge of the capacitive structure and provides electrical connections to the metallized areas extending to the same edge. A capacitive property is exhibited where the metallized areas overlie one another.

Capacitive structures of the type noted above are exemplified in U.S. Pat. Nos. 4,462,062, 4,488,340, and 4,531,268. These patents disclose that such a capacitive structure may be advantageously made by winding, in overlying relation on a drum, two webs of polymeric film, each providing a dielectric substrate. Each web of such film has a metallized coating on its upper surface, except for narrow, longitudinal, demetallized zones, which may be scribed by laser means, and which divide the metallized coating into a relatively wide metallized area extending to and along one edge and a relatively narrow metallized strip extending to and along the other edge. The webs, which are of equal width, are offset laterally such that as the webs are slit into parallel ribbons of uniform width before being wound on the drum, alternate ones of the successive layers of the overlying ribbons have their edges offset laterally in relation to the remaining layers. A conductive, metallic mass, which may be applied by a metal-spraying process, covers each edge of the overlying ribbons so as to provide electrical contacts to and between the metallized areas extending to and along such edge. The resultant structure, which is called a rope because it has a tendency to be somewhat limp, is compressed at an elevated temperature so as to form a more rigid structure, which is called a stick. The stick is sawed into discrete capacitors. In each capacitor, the conductive, metallic masses serve as electrodes, and a capacitive property is exhibited where the relatively wide metallized areas of the successive layers overlie one another.

It is known for an upper cover and a lower cover, each being a single, thicker plate of dielectric material, to cover the top and bottom surfaces of the group of capacitive layers and for each of the conductive, metallic masses to extend above the upper cover and below the lower cover so as to form respective upper and lower flanges, which bond the covers to the group of capacitive layers. The upper and lower covers provide mechanical and electrical protection to the capacitive structure. Moreover, if the capacitive structure is surface-mounted to a supporting substrate, the lower flanges elevate the lower cover in relation to the supporting substrate. Hence, the lower flanges may also be called stand-off feet or mounting feet. Typically, the capacitive layers and cover plates are built-up to a standardized thickness, e.g., 0.08 inch.

For further background, reference may be had to U.S. Pat. Nos. 3,670,378 and 4,229,865, which disclose other examples of capacitive structures of the type noted above.

Although capacitive structures of the type noted above as known heretofore have performed well in many applications, there has been a need, to which this invention is addressed, for improvements in such structures.

SUMMARY OF THE INVENTION

It is a principal object of this invention to provide an improved capacitive structure of the type noted above.

Broadly, a capacitive structure according to this invention comprises a group of capacitive layers, in stacked relation to each other, and at least one group of at least three dielectric layers, in stacked relation to each other. In comparison, each of the capacitive layers has a lesser thickness, and each of the dielectric layers has a greater thickness. Each of the capacitive and dielectric layers has opposed first and second edges. Each capacitive layer includes a dielectric substrate, preferably poly(ethylene terephthalate) film, and a metallized area, which covers a major portion of one surface of the dielectric substrate, preferably its upper surface, and which extends only to one edge of such capacitive layer. The metallized areas of alternate layers extend to opposite edges. If the metallized area has been produced by scribing of a metallized coating on such surface, a metallized strip covering a minor portion of such surface may extend only to the opposite edge.

In accordance with this invention, said one group of dielectric layers cover a top surface of the group of capacitive layers. Preferably, a similar group of dielectric layers cover a bottom surface of the group of capacitive layers.

Moreover, the first edges of alternate ones of the group of capacitive layers extend beyond the first edges of the remainder of such group and the second edges of alternative ones of such group extend beyond the second edges of the remainder of such group, so as to form relatively narrow indentations along each of the edges of the group of capacitive layers. Likewise, the first edges of alternatives ones of each group of dielectric layers extend beyond the first edges of the remainder of such group and the second edges of alternative ones of such group of dielectric layers extend beyond the second edges of the remainder of such group, so as to form relatively wide indentations along each of the first and second edges of each group of dielectric layers. Along each edge of the capacitive structure, a mass of conductive material, preferably a metallic material applied by a metal-spraying process, covers such edge and extends into the indentations formed along such edge so as to bond the capacitive and dielectric layers to each other, and so as to provide electrical contacts to and between between the metallized areas extending to such edge. Because the indentations formed along the edges of the dielectric layers are wider than the indentations formed along the edges of the capacitive layers, a better bond can be achieved, in contrast with known structures employing single, thicker, upper plates and single, thicker, lower plates.

As a further feature of this invention, the masses of conductive material may also extend beneath the group of dielectric layers, if used, which cover the bottom surface of the group of capacitive layers, so as form stand-off feet separated from each other. Moreover, a piece of dielectric tape may be adhesively applied, so as to cover the group of dielectric layers covering the top surface of the group of capacitive layers, and so as to cover upper portions of the masses of conductive material. Preferably, the tape is made of a material, such as polytetrafluroethylene, which is resistant to soldering temperatures. A particular advantage of this invention resides in that thinner capacitive layers may be used. In accordance with known physical principles, thinner capacitive layers produce better capacitors. The capacitive structure can be built-up to a desired thickness, e.g., 0.08 inch, by means of appropriate numbers of dielectric layers above and below the group of capacitive layers.

These and other objects, features, and advantages of this invention will be better understood from the following description of the preferred embodiment of this invention, with reference to the accompanying drawings.

BRIEF DESCRIPTION OF THE DRAWINGS

FIG. 1 is a greatly enlarged, cross-sectional view of a capacitive structure constituting prior art, a central portion of such structure being omitted for illustration purposes.

FIG. 2 is a further enlarged, cross-sectional view of a capacitive structure constituting a preferred embodiment of this invention, a central portion of such structure being omitted for illustration purposes.

DETAILED DESCRIPTION OF PREFERRED EMBODIMENT

Before a detailed description is given of a capacitive structure constituting a preferred embodiment of this invention, it will be useful to consider a capacitive structure exemplifying prior art, as shown in FIG. 1.

As shown in FIG. 1, a capacitive structure 10 comprises a group of capacitive layers 12, each including a dielectric substrate with metallized areas 14 covering the upper surface of the dielectric substrate, except for narrow, longitudinal, demetallized zones 14a dividing the metallized surface 14 into a relatively wide area 14b and a relatively narrow strip 14c. Alternative ones of the capacitive layers 12, which are of equal width, are offset laterally in relation to each other such that alternative ones of the capacitive layers 12 have their edges offset laterally in relation to the remaining layers. Thus, indentations 20 are formed along the left edges of the capacitive layers 12, and indentations 22 are formed along the right edges of the capacitive layers 12. An upper cover 16 and a lower cover 18, each being a single, thicker plate of dielectric material, are provided respectively at the top and bottom surfaces of the group of capacitive layers 12. A conductive, metallic mass 24, which may be applied by a metal-spraying technique, covers the left edges of the capacitive layers 12 and covers the left edges of the upper cover 16 and the lower cover 18. The mass 24 extends above the upper cover 16, so as to form an upper flange 26 bonding the upper cover 16 to the capacitive layers 12. The mass 24 extends beneath the lower cover 18, so as to form a lower flange 28 bonding the lower cover 18 to the capacitive layers 12 at the left side of the capacitive structure 10. Similarly, a conductive metallic mass 30 covers the right edges of the capacitive layers as well as the right edges of the upper cover 16 and the lower cover 18. The mass 30 extends similarly above the upper plate 16, so as to form an upper flange 32, and below the lower cover 18, so as to form a lower flange 34. The upper flange 32 and the lower flange 34 bond the cover plates 16, 18, to the capacitive layers 12 at the right side of the capacitive structure 10. Each of the lower flanges 28, 34, also serves as a stand-off foot, which elevates the cover plate 18 in relation to a circuit board or other substrate (not shown) to which the capacitive structure 10 may be surface mounted.

In contrast with the capacitive structure 10 shown in FIG. 1 and described above, FIG. 2 shows a capacitive structure 40 constituting a preferred embodiment of this invention.

The capacitive structure 40 comprises a group of capacitive layers 42, in stacked relation to each other, which are similar to the capacitive layers 12 of the capacitive structure 10 described above, except that each capacitive layer 42 of the capacitive structure 40 comprises a dielectric substrate, which is thinner than the dielectric substrate of each capacitive layer 12 of the capacitive structure 10. Each capacitive layer 42 of the capacitive structure 40 has a metallized upper surface 44, which is divided by a narrow, longitudinal, demetallized zone 44a into a relatively wide metallized area 44b and a relatively narrow metallized strip 44c. The demetallized zone 44a may be scribed by laser means (not shown) in a known manner. The metallized areas 44b on alternate ones of the capacitive layers 42 extend to opposite edges of the capacitive structure 40.

Moreover, the left edges of alternative ones of the capacitive layers 42 extend beyond the left edges of the remainder of the capacitive layers 42 and the right edges of alternative ones of the capacitive layers 42 extend beyond the right edges of the remainder of the capacitive layers 42, so as to form indentations 50 between every third one of the capacitive layers 42 along the left edges of the capacitive layers 42 and so as to form indentations 52 between every third one of the capacitive layers 42 along the right edges of the capacitive layers 42. Preferably, the indentations 50 are bounded partially by strip-like portions of the metallized areas 44b extending to the left edge of the capacitive structure 40, and the indentations 52 are bounded partially by strip-like portions of the metallized areas 44b extending to the right edge of the capacitive structure 40.

In accordance with this invention, an upper group of dielectric layers 56 and a lower group of dielectric layers 58 are provided, each of the dielectric layers 56, 58, being thicker than each of the capacitive layers 42. The left edges of alternatives ones of the dielectric layers of each group extend beyond the left edges of the remainder of the dielectric layers of such group and the right edges of alternative ones of the dielectric layers of each group extend beyond the right edges of the remainder of the dielectric layers of such group, so as to form indentations 60 between every third one of the dielectric layers 56 along the left edges of the dielectric layers 56, so as to form indentations 62 between every third one of the dielectric layers 56 along the right edges of the dielectric layers 56, so as to form indentations 64 between every third one of the dielectric layers 58 along the left edges of the dielectric layers 58, and so as to form indentations 66 between every third one of the dielectric layers 56 along the right edges of the dielectric layers 56. The indentations 60, 62, 64, 66, are relatively wide, in comparison with the relatively narrow indentations 50, 52, because each of the dielectric layers 56, 58, is thicker than each of the capacitive layers 42.

As shown, each of the capacitive layers 42 and each of the dielectric layers 56, 58, has a uniform width. Alternative ones of the group capacitive layers 42 are offset laterally in relation to the remainder of the group of capacitive layers 42. Alternative ones of each group of dielectric layers 56, 58, are offset laterally in relation to the remainder of such group.

Along the left edges of the capacitive and dielectric layers, a mass 70 of conductive, metallic material, which may be applied by a metal-spraying process, completely covers such edges, substantially fills the indentations 50, 60, 64, and accordingly provides electrical connections to and between the metallized areas 44b extending to the left edges of the capacitive layers 42. Along the right edges of the capacitive and dielectric layers, a mass 74 of conductive, metallic material, which may be similarly applied, completely covers such edges, substantially fills the indentations 52, 62, 66, and accordingly provides electrical connections to and between the metallic areas 44b extending to the right edges of the capacitive layers 42. Since the indentations 50, 52, are bounded partially by strip-like portions of the metallized areas 44b extending to the respective edges of the capacitive structure 40, good electrical contact is achieved with the respective masses 70, 74. Hence, the capacitive layers 42 exhibit a capacitive property wherever the relatively wide metallized areas 44b having electrical connections to the conductive mass 74 overly the relatively wide metallized areas 44b having electrical connections to the conductive mass 70. The metallic strips 44c do not exhibit a capacitive property. Electrical leads (not shown) may be soldered to the conductive masses 70, 74, which serve as electrodes.

By substantially filling the indentations 60 and the indentations 64, as well as the indentations 50, the mass 70 bonds the capacitive and dielectric layers tightly to each other along the left edge of the capacitive structure 40. By substantially filling the indentations 60 and the indentations 66, as well as the indentations 52, the mass 74 bonds the capacitive and dielectric layers tightly to each other along their right edge of the capacitive structure 40. Because the indentations 60, 64, are wider than the indentations 50, a better bond can be achieved, in contrast with capacitive structures employing single, thicker, upper plates and single, thicker, lower plates, as exemplified by the capacitive structure 10 of FIG. 1.

As an additional feature contemplated by this invention, a heavy gauge, dielectric tape 78 is affixed by a thin layer of adhesive 80 to the uppermost of the dielectric layers 56 and to upper portions of the masses 70, 74, which do not extend above the uppermost of the dielectric layers 56. The tape 78 can be advantageously used to carry identifying indicia and to provide a uniform surface for vacuum pick-up. Whether or not the tape 78 is included, a sufficient number of dielectric layers 56, 58, are used to build-up the thickness of the capacitive structure 40 to a desired thickness, e.g., 0.08 inch. The capacitive structure 40 does not rely upon the capacitive layers 42 to build-up its thickness.

A preferred material for the dielectric substrates of the capacitive layers 42 and for the dielectric layers 56, 58, is poly(ethylene terephthalate) film which is of a thinner gauge for each of the capacitive layers 42 and which is of a thicker gauge for each of the dielectric layers 56, 58. A preferred material for the tape 78 is polytetrafluroethylene, which is resistant to soldering temperatures.

A preferred material for each of the conductive masses 70, 74, is aluminum, which is applied by a spraying process and which is overcoated with copper, which in turn is overcoated with a lead-tin dip. If external leads (not shown) are soldered to the conductive masses 70, 74 overcoating may be omitted and the tape 78 be extended, so as to constitute a full wrap around the capacitive structure 40. If the capacitive structure 40 is surface-mounted on a circuit board or other supporting substrate (not shown) the lower flanges 72, 76 serve as stand-off feet elevating the lowermost of the dielectric layers 58 from the supporting substrate.

The group of capacitive layers 42 may be advantageously made by a winding process employing two webs of metallized film of equal width, narrow, longitudinal, demetallized zones have been scribed by laser means (not shown) on each web, and alternate ones of the webs being offset laterally in relation to each other, such a process being disclosed in U.S. Pat. Nos. 4,462,062, 4,488,340, and 4,531,268. Each group of dielectric layers, i.e., the upper group of dielectric layers 56 and the lower group of dielectric layers 58, may be advantageously made by a similar process employing two webs of dielectric film of equal width, each web of dielectric film being equal in width to but thicker than each web of metallized film, and alternate ones of the webs being offset similarly.

After the groups of conductive and dielectric layers have been arranged such that the upper group of dielectric layers 56 covers the top surface of the group of capacitive layers 42 and such that the lower group of dielectric layers 58 covers the bottom surface of the groups of capacitive layers 42, and after the conductive masses 70, 74, have been applied, the resultant structure, which may be suitably called a rope, may be then compressed at an elevated temperature, so as to form a rigid structure, which may be suitably called a stick, and in which the dielectric layers 56 will be heat-bonded to one another, the dielectric layers 58 will be heat-bonded at many points to one another, and the uppermost of the dielectric layers 58 will be heat-bonded at many points to the lowermost of the capacitive layers 42. Also, although not as strongly bonded at the dielectric-metallized interfaces, the lowermost of the dielectric layers 56 will be heat-bonded to the uppermost of the capacitive layers 42 and the capacitive layers 42 will be heat-bonded to one another. The dielectric layers 56, 68, provide mechanical and electrical protection to the capacitive layers 42.

It the tape 78 is included, the tape 78 is applied after the resultant structure noted above has been compressed at elevated temperature, so as to complete the capacitive structure 40. If the tape 78 is omitted, the compressed structure completes the capacitive structure 40. In either instance, the capacitive structure 40 may be then sawed to form discrete capacitors.

It is intended by the following claims to cover all modifications and improvements which come within the true spirit and scope of this invention.

I claim:

1. A capacitive structure comprising a group of capacitive layers, in stacked relation to one another, and at least one group of at least three dielectric layers, in stacked relation to one another, the group of capacitive layers having a top surface, each of the capacitive layers having a lesser thickness than each of the dielectric layers, each of the capacitive and dielectric layers having opposite first and second edges, each capacitive layer including a dielectric substrate and a metallized area, which covers a major portion of one surface of the dielectric substrate of such capacitive layer and which extends only to one of the first and second edges of such capacitive layer, the metallized areas on alternate ones of the capacitive layers extending to opposite edges, said one group of dielectric layers covering the top surface of the group of capacitive layers, the first edges of alternative ones of the group of capacitive layers extending beyond the first edges of the remainder of the group of capacitive layers and the second edges of alternative ones of said one group of capacitive layers extending beyond the second edges of the remainder of the group of capacitive layers, so as to form relatively narrow indentations along each of the first and second edges of the group of capacitive layers, the first edges of alternative ones of said one group of dielectric layers extending beyond the first edges of the remainder of such dielectric layers and the second edges of alternative ones of said one group of dielectric layers extending beyond the second edges of the remainder of said one group of dielectric layers, so as to form relatively wide indentations along each of the first and second edges of said one group of dielectric layers, the capacitive structure further comprising a first mass of conductive material covering and extending into the indentations formed along the first edges, so as to provide electrical connections to and between the metallized areas extending to the first edges of the capacitive layers, and a second mass of conductive material covering and extending into the indentations formed along the second edges, so as to provide electrical connections to and between the metallized areas extending to the second edges of the capacitive layers, the masses of conductive material bonding the capacitive and dielectric layers to one another.

2. The capacitive structure of claim 1 further comprising a similar group of dielectric layers, each of the similar group of dielectric layers having opposite first and second edges, the first edges of alternative ones of the similar group of dielectric layers extending beyond the first edges of the remainder of the similar group of dielectric layers and the second edges of alternative ones of the similar group of dielectric layers extending beyond the second edges of the remainder of the similar group of dielectric layers, so as to form relatively wide indentations along the first and second edges of the similar group of dielectric layers, and wherein the plurality of capacitive layers has a bottom surface, which is covered by the similar group of dielectric layers.

3. The capacitive structure of claim 2 wherein the masses of conductive material extend beneath the group of dielectric layers covering the bottom surface of the group of capacitive layers, so as to form stand-off feet, which are separated from each other.

4. The capacitive structure of claim 3 further comprising a piece of dielectric tape covering the group of dielectric layers covering the top surface of the group of capacitive layers.

5. The capacitive structure of claim 4 wherein the piece of dielectric tape also covers a portion of each mass of conductive material.

6. The capacitive structure of claim 5 wherein the piece of dielectric tape is attached adhesively to the uppermost of the group of dielectric layers covering the top surface of the group of capacitive layers.

7. The capacitive structure of claim 6 wherein the piece of dielectric tape also is attached adhesively to a portion of each mass of conductive material.

8. The capacitive structure of claim 1 wherein the metallized area of each capacitive layer covers a major portion of an upper surface of the dielectric substrate of such capacitive layer and wherein each of the capacitive layers and each of the dielectric layers has a uniform width, alternative ones of the group of capacitive layers being offset laterally in relation to the remainder of the group of capacitive layers and alternative ones of said one group of dielectric layers being offset laterally in relation to the remainder of said one group of dielectric layers.

9. The capacitive structure of claim 8 further comprising a similar group of dielectric layers, each of the similar group of dielectric layers having opposite first and second edges, the first edges of alternative ones of the similar group of dielectric layers extending beyond the first edges of the remainder of the similar group of dielectric layers and the second edges of alternative ones of the similar group of dielectric layers extending beyond the second edges of the remainder of the similar group of dielectric layers, so as to form relatively wide indentations along the first and second edges of the similar group of dielectric layers, and wherein the plurality of capacitive layers has a bottom surface, which is covered by the similar group of dielectric layers, and wherein alternative ones of said one group of dielectric layers are offset laterally in relation to the remainder of said group of dielectric layers and alternative ones of the similar group of dielectric layers are offset laterally in relation to the remainder of the similar group of dielectric layers.

10. The capacitive structure of claim 9 wherein the masses of conductive material extend beneath the group of dielectric layers covering the bottom surface of the group of capacitive layers so as to form stand-off feet, which are separated from each other.

11. The capacitive structure of claim 10 wherein a piece of dielectric tape is attached adhesively to the uppermost of the group of dielectric layers covering the top surface of the group of capacitive layers and to a portion of each mass of conductive material, so as to cover the group of dielectric layers covering the top surface of the group of dielectric layers and so as to cover said portions of the masses of conductive material.

* * * * *